United States Patent
Faonte et al.

(10) Patent No.: US 12,321,794 B2
(45) Date of Patent: Jun. 3, 2025

(54) HYBRID LANGUAGE MODEL ARCHITECTURE FOR API ORCHESTRATION INCLUDING CHAIN OF THOUGHT

(71) Applicant: Goldman Sachs & Co. LLC, New York, NY (US)

(72) Inventors: Giovanni Faonte, Jersey City, NJ (US); Shreya Chandrashekar Srinarasi, Jersey City, NJ (US); Mithun Azhagappan, New York, NY (US); Dinesh Gupta, Princeton Junction, NJ (US); Christopher M. Churchman, New York, NY (US); Cheska Adrianne Mauban, Queens, NY (US)

(73) Assignee: Goldman Sachs & Co. LLC, New York, NY (US)

(*) Notice: Subject to any disclaimer, the term of this patent is extended or adjusted under 35 U.S.C. 154(b) by 0 days.

(21) Appl. No.: 19/015,513

(22) Filed: Jan. 9, 2025

(65) Prior Publication Data
US 2025/0147820 A1 May 8, 2025

Related U.S. Application Data

(63) Continuation of application No. 18/929,480, filed on Oct. 28, 2024.

(60) Provisional application No. 63/593,502, filed on Oct. 26, 2023.

(51) Int. Cl.
G06F 3/00 (2006.01)
G06F 9/54 (2006.01)

(52) U.S. Cl.
CPC .................................. G06F 9/54 (2013.01)

(58) Field of Classification Search
CPC .......................................................... G06F 9/54
See application file for complete search history.

(56) References Cited

U.S. PATENT DOCUMENTS

| | | | |
|---|---|---|---|
| 11,201,835 B1* | 12/2021 | Roberts | H04L 47/781 |
| 11,804,225 B1* | 10/2023 | Agrawal | G10L 15/1815 |
| 2014/0082521 A1* | 3/2014 | Carolan | H04L 51/56 715/752 |
| 2015/0143258 A1* | 5/2015 | Carolan | H04L 51/18 715/752 |
| 2019/0188056 A1* | 6/2019 | Dimascio | G06F 40/35 |
| 2021/0303270 A1* | 9/2021 | Liu | G06F 8/30 |

(Continued)

FOREIGN PATENT DOCUMENTS

| | | | | |
|---|---|---|---|---|
| WO | WO-2019202302 A1 * | 10/2019 | | G06F 16/24522 |
| WO | WO-2019245943 A1 * | 12/2019 | | G10L 15/1815 |

OTHER PUBLICATIONS

Souhaila Serbout, From OpenAPI Fragments to API Pattern Primitives and Design Smells. (Year: 2021).*

Primary Examiner — Lechi Truong
(74) Attorney, Agent, or Firm — Fenwick & West LLP

(57) ABSTRACT

A hybrid architecture that combines the efficiency of small language models with the accuracy of large language models for enhanced selection of requested functionality and identification of data visualizations using a network system is described. For instance, an orchestration module employs a hybrid architecture using both small language models and large language models to generate API payloads for clients in a way that harnesses the benefits of both models.

17 Claims, 10 Drawing Sheets

(56) References Cited

U.S. PATENT DOCUMENTS

| | | | |
|---|---|---|---|
| 2021/0373984 A1* | 12/2021 | Lu | G06F 16/955 |
| 2022/0180056 A1* | 6/2022 | Hong | G06F 9/547 |
| 2022/0253607 A1* | 8/2022 | Aubineau | H04L 51/02 |
| 2023/0109545 A1* | 4/2023 | Wilkerson | H04L 9/3263 |
| | | | 713/175 |
| 2024/0362036 A1* | 10/2024 | Jacob | G06F 3/0481 |
| 2024/0412157 A1* | 12/2024 | Manzano | G06Q 10/087 |
| 2025/0029206 A1* | 1/2025 | Ranzinger | G06V 10/82 |

* cited by examiner

HYBRID LANGUAGE MODEL ARCHITECTURE FOR API ORCHESTRATION INCLUDING CHAIN OF THOUGHT

CROSS REFERENCE TO RELATED APPLICATIONS

This application is a continuation of U.S. patent application Ser. No. 18/929,480, filed Oct. 28, 2024, which claims priority to U.S. Provisional Application No. 63/593,502, filed Oct. 26, 2023, which are incorporated by reference in their entirety.

BACKGROUND

Field of Disclosure

The present invention relates generally to the field of natural language processing and machine learning. More specifically, this invention relates to hybrid language model architecture for orchestrating the generation and transmission of payloads including APIs within a system environment.

Description of the Related Art

Natural language processing (NLP) and machine learning technologies have shown significant advancements in recent years, allowing computers to understand and generate human language more efficiently and accurately. Language models play a crucial role in various NLP tasks, such as machine translation, summarization, sentiment analysis, and API orchestration.

Discussed herein are two general categories of language models: small language models and large language models. Small language models have fewer parameters, making them easier to train but often lacking the capacity to learn and generalize complex patterns in natural languages. As a result, small language models are not suitable for many challenging applications. Large language models, on the other hand, have a greater number of parameters, which allow them to generate highly accurate text and demonstrate impressive language-understanding capabilities. However, training large language models often requires intensive computational resources, power consumption, and time, making it difficult for many researchers and organizations to utilize their full potential.

To address these challenges, it is desirable to develop a system that combines the efficiency of small language models with the accuracy of large language models in a single architecture specifically designed for API orchestration systems. By implementing a hybrid architecture, such systems can achieve a balance between computational cost and performance, enabling more efficient workflows that employ the APIs.

SUMMARY

In some aspects, the systems and methods described herein relate to a method for generating a payload response for a requested functionality in a system environment, the method including: receiving, at a network system, a payload request from a client device, the payload request including a natural language request for the requested functionality; applying, at the network system, a small language model to the payload request to determine a set of candidate APIs from a catalog based on embeddings generated by the small language model that map the natural language in the payload request to the functionality of the APIs in the catalog; applying, at the network system, a large language model to the payload request and the candidate APIs to determine a selected API that performs the requested functionality, the large language model interpreting context and intent of the payload request to select a candidate API from the set of candidate APIs as the selected API based on the context and intent; executing the selected API to generate a payload response including the requested functionality; and transmitting the payload response to the client device.

In some aspects, the systems and methods described herein relate to a method, further including: generating the catalog for the network system by: accessing a plurality of APIs within a system environment including the network system; determining metadata associated with a functionality of each of the APIs in the plurality of APIs; and wherein the set of candidate APIs are selected from the plurality of APIs.

In some aspects, the systems and methods described herein relate to a method, further including: training the small language model to identify candidate APIs by mapping metadata describing the functionality of each API to language samples representing a plurality of payload requests.

In some aspects, the systems and methods described herein relate to a method, wherein accessing a plurality of APIs within the system environment includes accessing APIs from one or more additional network systems.

In some aspects, the systems and methods described herein relate to a method, wherein applying the large language model to the payload request and the set candidate APIs further includes: providing metadata associated with each candidate API to the large language model, and wherein selecting the candidate API as the selected API is further based on the metadata.

In some aspects, the systems and methods described herein relate to a method, wherein selecting candidate APIs further includes: determining, for each API of a plurality of APIs in the catalog, a score quantifying a likelihood the API is semantically or syntactically relevant to language in the payload request; selecting a number of APIs having a highest score as the candidate APIs.

In some aspects, the systems and methods described herein relate to a method, wherein selecting candidate APIs further includes: determining, for each API of a plurality of APIs in the catalog, a score quantifying a likelihood the API is semantically or syntactically relevant to language in the payload request; selecting the APIs having scores above a threshold score as the candidate APIs.

In some aspects, the systems and methods described herein relate to a method, wherein the network system executes the selected API and transmits the payload response to the client device.

In some aspects, the systems and methods described herein relate to a method, further including: providing a location of the selected API to the client device; and wherein a system hosting the location executes the selected API and the system transmits the payload response to the client device.

In some aspects, the systems and methods described herein relate to a method, wherein applying the large language model to the payload request and the candidate APIs to determine the selected API that performs the requested functionality includes: selecting one or more additional APIs for an API chain, and wherein: each of the one or more additional APIs provide a partial functionality related to the requested functionality, and the API chain, in aggregate, provides the requested functionality.

In some aspects, the systems and methods described herein relate to a non-transitory computer-readable storage medium including computer program instructions for a payload response for a requested functionality in a system environment, the computer program instructions, when executed, causing the one or more processors to: receive, at a network system, a payload request from a client device, the payload request including a natural language request for the requested functionality; apply, at the network system, a small language model to the payload request to determine a set of candidate APIs from a catalog based on embeddings generated by the small language model that map the natural language in the payload request to the functionality of the APIs in the catalog; apply, at the network system, a large language model to the payload request and the candidate APIs to determine a selected API that performs the requested functionality, the large language model interpreting context and intent of the payload request to select a candidate API from the set of candidate APIs as the selected API based on the context and intent; execute the selected API to generate a payload response including the requested functionality; and transmit the payload response to the client device.

In some aspects, the systems and methods described herein relate to a non-transitory computer-readable storage medium, wherein the computer program instructions, when executed, cause the one or more processors to: generate the catalog for the network system by: accessing a plurality of APIs within a system environment including the network system; determining metadata associated with a functionality of each of the APIs in the plurality of APIs; and wherein the set of candidate APIs are selected from the plurality of APIs.

In some aspects, the systems and methods described herein relate to a non-transitory computer-readable storage medium, further including: train the small language model to identify candidate APIs by mapping metadata describing the functionality of each API to language samples representing a plurality of payload requests.

In some aspects, the systems and methods described herein relate to a non-transitory computer-readable storage medium, wherein accessing a plurality of APIs within the system environment causes the one or more processors to: access APIs from one or more additional network systems.

In some aspects, the systems and methods described herein relate to a non-transitory computer-readable storage medium, wherein applying the large language model to the payload request and the set candidate APIs causes the one or more processors to: provide metadata associated with each candidate API to the large language model, and wherein selecting the candidate API as the selected API is further based on the metadata.

In some aspects, the systems and methods described herein relate to a non-transitory computer-readable storage medium, wherein selecting candidate APIs causes the one or more processors to: determine, for each API of a plurality of APIs in the catalog, a score quantifying a likelihood the API is semantically or syntactically relevant to language in the payload request; select a number of APIs having a highest score as the candidate APIs.

In some aspects, the systems and methods described herein relate to a non-transitory computer-readable storage medium, wherein selecting candidate APIs causes the one or more processors to: determine, for each API of a plurality of APIs in the catalog, a score quantifying a likelihood the API is semantically or syntactically relevant to language in the payload request; select the APIs having scores above a threshold score as the candidate APIs.

In some aspects, the systems and methods described herein relate to a non-transitory computer-readable storage medium, wherein the network system executes the selected API and transmits the payload response to the client device.

In some aspects, the systems and methods described herein relate to a non-transitory computer-readable storage medium, wherein the computer program instructions, when executed, cause the one or more processors to: provide a location of the selected API to the client device; and wherein a system hosting the location executes the selected API and the system transmits the payload response to the client device.

In some aspects, the systems and methods described herein relate to a non-transitory computer-readable storage medium, wherein applying the large language model to the payload request and the candidate APIs to determine the selected API that performs the requested functionality includes: select one or more additional APIs for an API chain, and wherein: each of the one or more additional APIs provide a partial functionality related to the requested functionality, and the API chain, in aggregate, provides the requested functionality.

Figure 1:
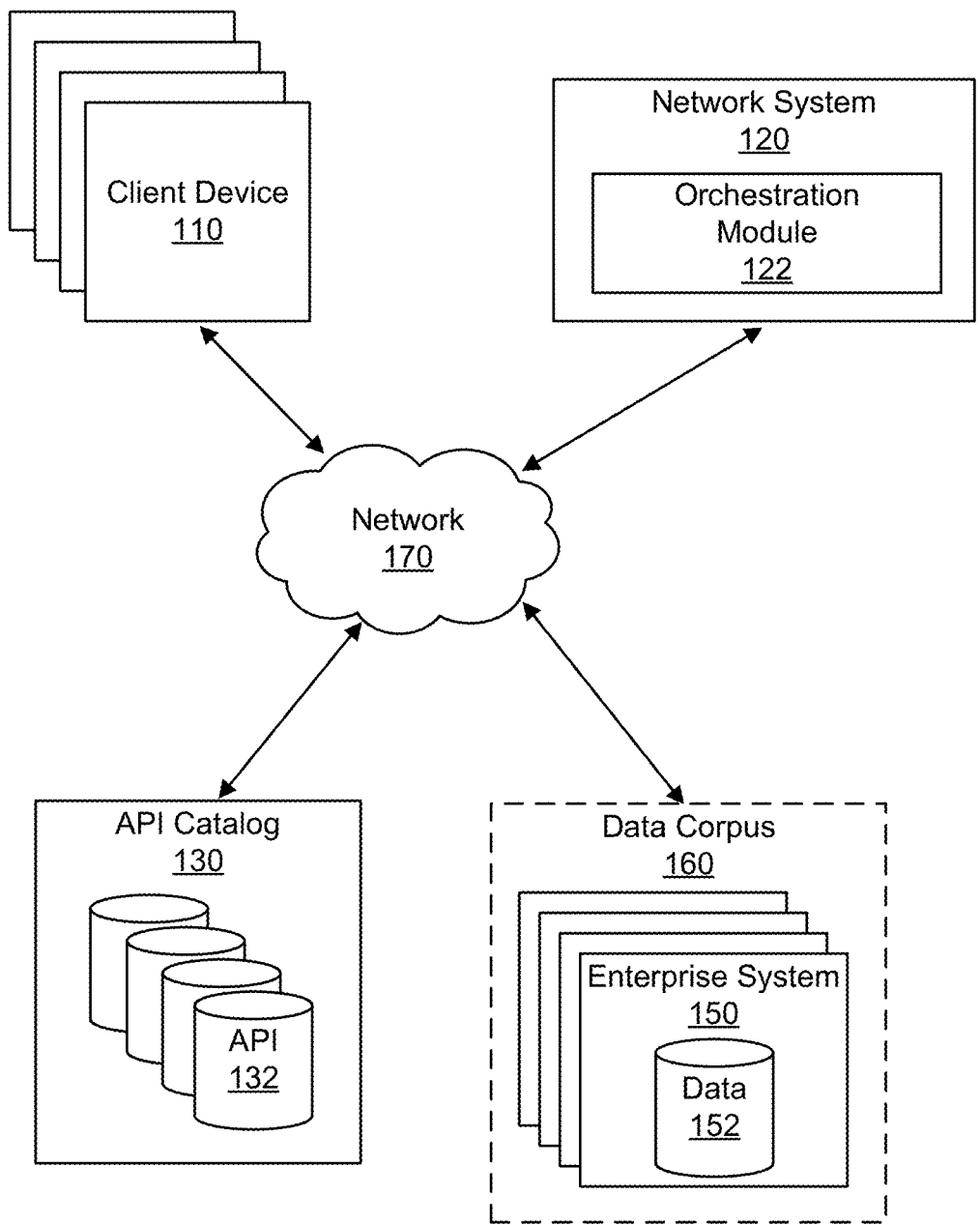
FIG. 1 illustrates a system environment configured for enabling client devices to efficiently identify, interpret, and manage data on a network system using hybrid model approaches, according to an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

An improved hybrid language model architecture for a system environment in which API orchestration occur is disclosed.

The disclosed system and methods combine the benefits of both small and large language models. For instance, the architecture addresses the drawbacks of small language models that have limited capacity to learn and generalize complex patterns in natural languages and large language models that require significant computational resources and time for training. The hybrid architecture is particularly advantageous in various natural language processing tasks such as (1) determining a payload from a natural language payload request, generating the payload, and delivering the payload, and (2) vectorizing information describing a large number of data visualizations (or APIs), processing a natural language request for a data visualization (or API), and using the vectorized information and processed natural language request to select the appropriate data visualization (or API).

To establish a foundation for this approach, the description turns to a brief description of the problem at hand. In recent years, language modeling has gained significant traction within the field of artificial intelligence and natural language processing. Language models play a key role in tasks such as machine translation, summarization, and sentiment analysis. There are generally two types of language models: small language models and large language models. Small language models have fewer parameters and are relatively easier to train, while large language models utilize a greater number of parameters and demonstrate an ability to generate more accurate and coherent text in various applications (while being much harder and expensive to train).

Small language models tend to be insufficient in various contexts, primarily due to their limited capacity to learn and generalize complex patterns and relationships present in natural languages. These models often fall short when tasked with challenging applications such as long-form text generation or deep semantic understanding. As a result, their usefulness is constrained, and they are less desirable for comprehensive language understanding.

On the other hand, large language models, in many ways, address the limitations posed by small language models. They can generate highly accurate text and demonstrate impressive language-understanding capabilities. However, training large language models comes at a significant cost in terms of computational resources, power consumption, and time requirements. This barrier often prevents many research teams and organizations from harnessing the full potential these models offer.

One possible solution to address this challenge is to develop systems that utilize both small and large language models in a synergistic manner. By implementing a hybrid architecture that combines the efficiency of small language models with the accuracy of large language models, such systems can achieve a balance between computational cost and performance. This tandem approach opens new possibilities for improved language understanding and enables more efficient deployment of language models across various tasks and applications.

Additionally, an efficient deployment of a hybrid system allows for scaling across network systems that would be unachievable for either of the models independently. To illustrate, a large language model is very accurate but suffers from limitations on input length (e.g., token), and therefore has trouble scaling when the input information is too large (e.g., all possible APIs in a catalog). On the other, a small language model (e.g., an embedder) allows the system to select a set of candidates but does not offer the same level of precision/accuracy in selecting information based on an input as does the LLM. By combining the two models in a hybrid approach, a system may scale by first using an embedder to reduce the number of possible options for selection and inputting the reduced options into a large language model for a refined selection. The converse example is also possible. That is, a large language model can be used to create vectors describing a multitude of data objects (e.g., APIs). Those LLM-generated vectors may then be searched using a small language model (e.g., an embedder) to determine which of the data objects are most appropriate. In both examples, the synergy of a large language model and small language model allows for scalable enterprise solutions.

The description herein provides a particular examples of a hybrid architecture that enables such synergies. For instance, the API orchestration methods below employ a hybrid architecture using both a small language model and a large language model to generate API payloads for clients in a way that harnesses the benefits of both models.

II. System Environment

FIG. 1 illustrates a system environment configured for enabling client devices to efficiently identify, interpret, and manage data on a network system using hybrid model approaches, according to an example embodiment. In the illustrated example, the system environment includes a client device 110, a network system 120, an API catalog 130 including APIs 132, a network system 150 including data 152 which forms a data corpus 160, and a network 170. The network system 120 includes an orchestration module 122 and an analytics module 124. The system environment 100 may include one or more client devices 110 (e.g., 1, 2, 3, 5, . . . , N client devices) and/or may include one or more network system 150 (e.g., 1, 2, 3, 5, . . . , N network systems). Some embodiments of system environment 100 have different systems and modules than those described herein. Similarly, functions of the systems and modules can be distributed within the system environment 100 in a different manner than is described herein.

Within the system environment 100, the network system 120 generates a payload response in response to receiving a payload request from a client device 110. A payload request is a request for information that is accessible, derivable, or visualizable (e.g., via APIs) within the system environment 100. Usually, a payload request is a natural language input from a user using the client device 110A, and payload response is a response generated by the network system 120 that provides that information. In various configurations, the payload response may be, e.g., directly providing the requested information, providing an API 132 that, when executed, accesses or derives the information within the environment 100. In some instances, rather than providing the API 132 directly, the network system 120 may execute the API 132 locally and provide the generated visualizations and/or a result of the executed API 132. Moreover, the network system 120 may also provide a user interface for some (or all) users to create new APIs and/or within the system environment 100.

In an example, the payload request may describe a request for, e.g., contract information within the system. To that end, the payload request may be, e.g., "What were Metrics A at Entity B at Event C for Data Corpus D yesterday?" Given this payload request, the payload response may be an API 132 that calculates the requested daily volumes, and/or an API 132 that enables the requesting client device 110 to access the appropriate databases and derive any requested information. As an express example to the query above, the payload response may be, e.g., a data structure resulting from resulting from execution of an API 132 including the information "Asset: Title 1 for Entity 1, Volume: Metric 1; Asset: Title 2 for Entity 2, Volume: Metric 2," etc.

The client device 110 can be any computing device configured to interact with the analytics module 124. Although FIG. 1 shows several client devices 110, the system environment 100 may include any number of such devices. The client devices 110 present one or more user interfaces via which users may search for APIs 132. Various embodiments of the client devices 110 and user interfaces are described in greater detail below, with reference to FIG. 2.

The network system 120 may utilize the orchestration module 122 to generate a payload response that includes an API 132 or information generated by an executed API 132. As part of this process, at a high level, the network system 120 builds an API catalog 130, applies a small language model to the payload request to determine candidate APIs from the API catalog 130 that may be pertinent to the payload request, applies a large language model to the payload request and candidate APIs to determine a selected API (based on the language of the payload request and information describing the candidate APIs), executes the selected API to generate the payload response, and sends the payload response the client device 110. Details of the orchestration module 122 and its process are provided below in regard to FIG. 3 below.

An API catalog 130 stores a catalog of APIs 132. Each API 132, in general, may perform some function that enables the network system 120 to respond to payload requests. For example, the API 132 may access data from a first system, compare data from two systems, analyze data from a first system and apply a model to the data using a second system, etc. Additionally, each API 132 is usually associated with information (e.g., name, size, metadata) that describes its functionality. For example, the metadata for an API 132 may describe the functionality, location, applied models, information stores it accesses, names, dates, sizes, speeds, contracts, etc. of the API 132. To illustrate, for instance, there may be an API 132 capable of pulling transaction volumes from a secure financial database and its metadata describes that functionality, or there may be an API 132 capable of performing a autoregressive integrated moving average model to time series from the exchange database.

A network system 150 is one or more systems or databases connected to the network system 120 within the system environment 100 that include data 152 for responding to payload requests. The data 152 in the network system(s) 150 may include APIs 132 for the API catalog 130, information accessible by an API 132, functionality for deriving information, etc. More broadly, a network system 150 may include information necessary to generate a payload response for a payload request generated by a client device 110, in whatever format may be applicable.

In aggregate, information from data 152 in the network system(s) 150 form a data corpus 160. The data corpus 160 includes underlying data that is visualized within the widgets 142, retrievable via APIs 132, executable via APIs 132, etc., that may be included in a payload response. Although the data corpus 160 is shown as a distinct entity, the data corpus may be part of the network system 120.

Data in the data corpus 160 can describe a multitude of topics. In an embodiment, the data is one or more data structures describing financial data (e.g., asset prices). However, the disclosed techniques can be applied to any corpus or structure of data for which APIs 132 may act on. In the case of financial data, the data corpus 160 may include information about each transaction made on one or more exchanges involving one or more assets that are tracked by network system 120. The information for a transaction may include the asset or assets traded, the price, a timestamp indicating when the transaction occurred, and derived data, such as volatility surfaces and discount curves. The information for the transaction may include additional data, such as an identifier of the buyer, an identifier of the seller, an identifier of the trading platform or exchange through which the transaction occurred, etc. The data corpus 160 may receive market data (e.g., from computing systems of the exchanges or trading platforms) in periodic batches (e.g., once an hour or once a day). Additionally or alternatively, market data may be received in one or more continuous or semi-continuous data streams, or on demand, etc.

As shown in FIG. 1, client device 110, network system 120, API catalog 140, and network system 150 are in communication with one another via a network(s) 170. In one embodiment, the network 170 is the Internet or any combination of a LAN, a MAN, a WAN, a mobile, wired or wireless network, a private network, or a virtual private network. While only a client device 110 and a single catalog 130 are shown in FIG. 1, any number of client devices 110 and catalogs 130 can be in communication with orchestration module 122 via the network 170.

The network 170 provides the communication channels via which the other elements of the networked computing environment 100 communicate. The network 170 can include any combination of local area and wide area networks, using wired or wireless communication systems. In one embodiment, the network 170 uses standard communications technologies and protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, some or all of the communication links of the network 170 may be encrypted using any suitable technique or techniques.

Client Device

Figure 2:
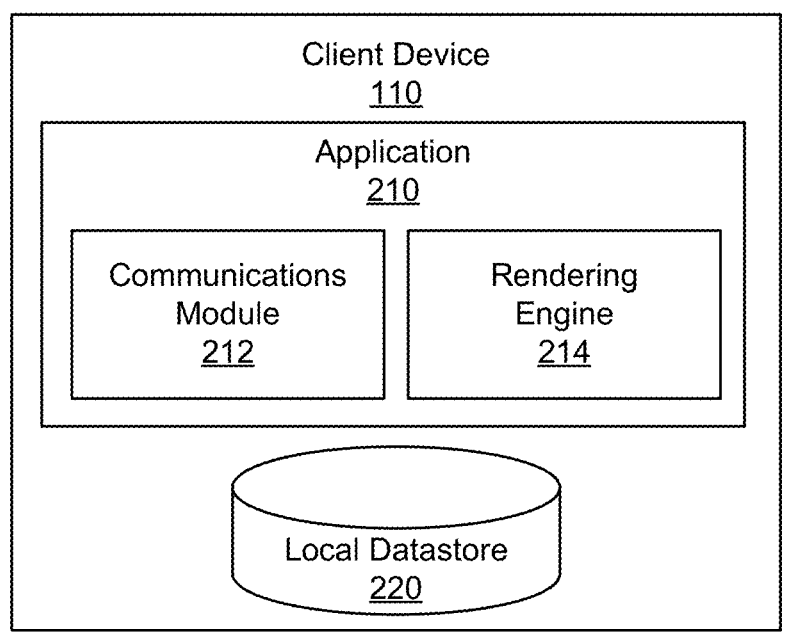
FIG. 2 illustrates one embodiment of a client device that may be used to interact with the network system.

FIG. 2 illustrates one embodiment of a client device 110 that may be used to interact with the network system 120. In the illustrated example, the client device 110 includes an app 210 and a local datastores 220. In other embodiments, the client device 110 includes different or additional elements. In addition, the functions may be distributed among the elements in a different manner than described.

The application 210 is software that executes on the client device 110 to enable interaction with the analytics module 124. The application 210 may include a communications module 212 and a rendering engine 214. The communications module 212 sends requests for APIs 132 (e.g., a payload request) to the network system 120 over the network 170 and receives/processes search results and data for providing selected APIs 132 (e.g., a payload response). The rendering engine 214 causes the client device 110 to display various visualizations provided by the APIs 132. The rendering engine 214 may interact with or be executed by one or more graphics processing units (GPUs) to generate the visualizations. The local datastore 220 includes one or more computer-readable media that store the data used by the client device 110. For example, the local datastore 220 may include cached copies of data used by the APIs 132.

Orchestration Module

Figure 3:
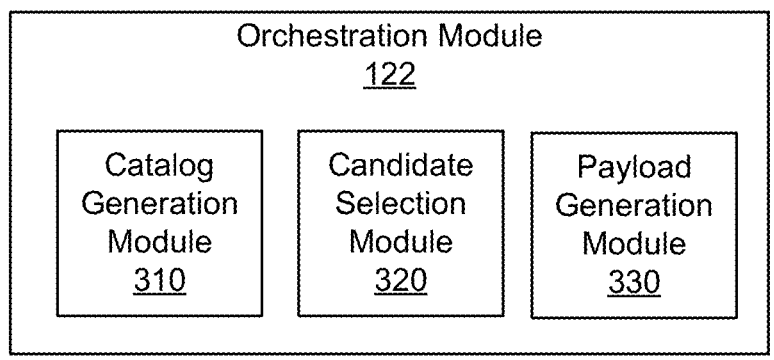
FIG. 3 illustrates an orchestration system, according to an example embodiment.

As described above, the orchestration module 122 receives payload requests from a client device 110 via the network 170, and sends payload responses to the client device 110 via the network 170. FIG. 3 illustrates an orchestration system, according to an example embodiment. As illustrated, the orchestration module 122 includes a catalog generation module 310, a candidate selection module 320, and a payload generation module 330. Some embodiments of orchestration module 122 have different systems and modules than those described herein. Similarly, functions of the systems and modules can be distributed within the orchestration module 122 in a different manner than is described herein.

The catalog generation module 310 generates catalogs (e.g., catalog 130) within the system environment 100. To do so, the catalog generation module 310 may access APIs (e.g., API 132) from throughout the environment 100 (e.g., from a network system 150) and store them within the API catalog 130. When accessing the API's, the catalog generation module 310 may also access or generate metadata describing those APIs. For example, the catalog generation module 310 may access a group of APIs from the data corpus 160 within the environment 100, extract or derive metadata describing those APIs, and store the APIs in the API catalog 130. Notably, "storing" the API in the API catalog 130 may indicate a storage location of the API (e.g., on a network system 150) rather than storing the API itself.

In generating the API catalog 130, the catalog generation module 310 may group or chain various APIs according to various principles. In an example, the catalog generation module 310 may generate the API catalog 130 including a group of APIs from a single network system 150 or specific group of network systems 150, or may generate a catalog including all APIs having a similar functionality from within the data corpus 160. In another example, the catalog generation module 310 may store a chain of APIs that, in the aggregate, can perform a single function (e.g., access information A, access information B, and perform function C based on accessed information A and accessed information B). Chaining APIs is discussed in greater detail below and in regard to FIGS. 6 and 7.

Regardless of whether catalog generation module 310 generates an API catalog 130 including single, grouped, or chained APIs, the catalog generation module 310 extracts information describing the single, grouped, and chained APIs. For instance, the catalog generation module 310 may generate an API catalog 130 of APIs 132 and store their metadata, description, and name.

The candidate selection module 320 receives a payload request and generates candidate APIs. To do so, the candidate selection module 320 applies a small language model to the payload request. In an example configuration, the small language model is an embedder or other similar model configured for performing searches based on embeddings (but other small language models are possible). The small language model uses trained embeddings to identify a set of candidate APIs in an API catalog 130 based on language in the payload request. The trained embeddings map high-dimensional vectors representing semantic and syntactic properties of a payload request (e.g., generates a vector representing the natural language request) to the information describing the APIs (e.g., to vectors representing the API 132 and/or the API's metadata). In other words, the small language model identifies APIs having metadata semantically or syntactically similar to language in the payload request. For instance, an embedding may associate the word "Convert" in a payload request to all APIs dealing with a conversion rate between a first economic indicator and a second economic indicator (as indicated by their associated information), and the candidate selection module 320 may select those APIs.

These embeddings are generated through the training process where the small language model of the candidate selection module 320 learns to associate linguistic patterns and relationships in a payload request to APIs in a catalog within a training dataset. When given an input prompt, the model looks up the embeddings for each token or word in the payload request. The model computes a contextualized representation considering the surrounding context and maps that contextualized representation to various APIs based on the trained embedding. By leveraging the learned relationships between words within the embedding space, the model can then assess the likelihood that words in a payload request relate to the functionality of various APIs. Subsequently, the model generates candidate APIs for the payload request by selecting the most suitable API candidates based on the embedding-derived probabilities.

In various examples, different criteria can be set when determining which APIs to select as candidate APIs. For instance, the selected candidate APIs may include a number of highest ranked APIs (according to a similarity and/or probability score), all APIs having at least a threshold probability and/or similarity score to payload request, etc. In whatever the implementation, the score quantifies the likelihood the candidate API is semantically and/or syntactically relevant to the language (or a language sample from) the payload request.

The payload generation module 330 selects an API from the candidate APIs to generate a payload response. To do so, the payload generation module 330 applies a large language model to the payload request and the candidate APIs. The large language model selects an API from the candidates based on the language of the payload request by employing its ability to deeply understand patterns, context, intent and relationships within the language. In other words, the large language model identifies APIs in the set of candidate APIs that are contextually and/or intentionally relevant given the language in the payload request.

When given the payload request, the large language model processes each token or word in the prompt and embeds them using its extensive knowledge of the linguistic space. This results in a highly detailed and contextualized representation of the words. Leveraging its more advanced architecture and a larger number of parameters (than the small language model), the large language model then evaluates the suitability of each candidate API in the list by considering not only the semantic and syntactic compatibility with the payload request but also the pragmatic and contextual compatibility with the payload request. Typically, the large language model scores each of the candidate APIs based on these factors, and the payload generation module 330 selects the candidate API that best aligns with the understood meaning, structure, and intent of the prompt request.

Once selected, the payload generation module 330 executes the API to generate the payload response. Executing the API may cause the payload generation module 330 to access information from within the system environment 100, apply models to information within system environment 100, etc. The orchestration module 122 may send the payload response to the client device 110 once determined by the payload generation module 330. In other examples, the orchestration module 122 may provide the selected API to the client device 110, or provide the location of the selected API for the client device 110 to access within the environment 100 as the payload response.

Note that the segregation of models here is important. The small language model identifies candidate APIs that are merely semantically and syntactically relevant, while the large language model selects the candidate that is semantically, syntactically, intentionally and contextually relevant. While it is possible to apply either the small language model or the large language model individually to identify the appropriate API to generate the payload response, neither solution is as elegant as the dual-model approach. In the former case, while the small language model may be less computationally expensive and more efficient, the smaller scale of that model oftentimes misses the context and intent of the language in the payload request. In the latter, even though the large language model is more robust in identifying relevant APIs, it is much more computationally expensive. Blending the model allows the network system 120 to utilize the strengths of both models simultaneously.

Figure 4:
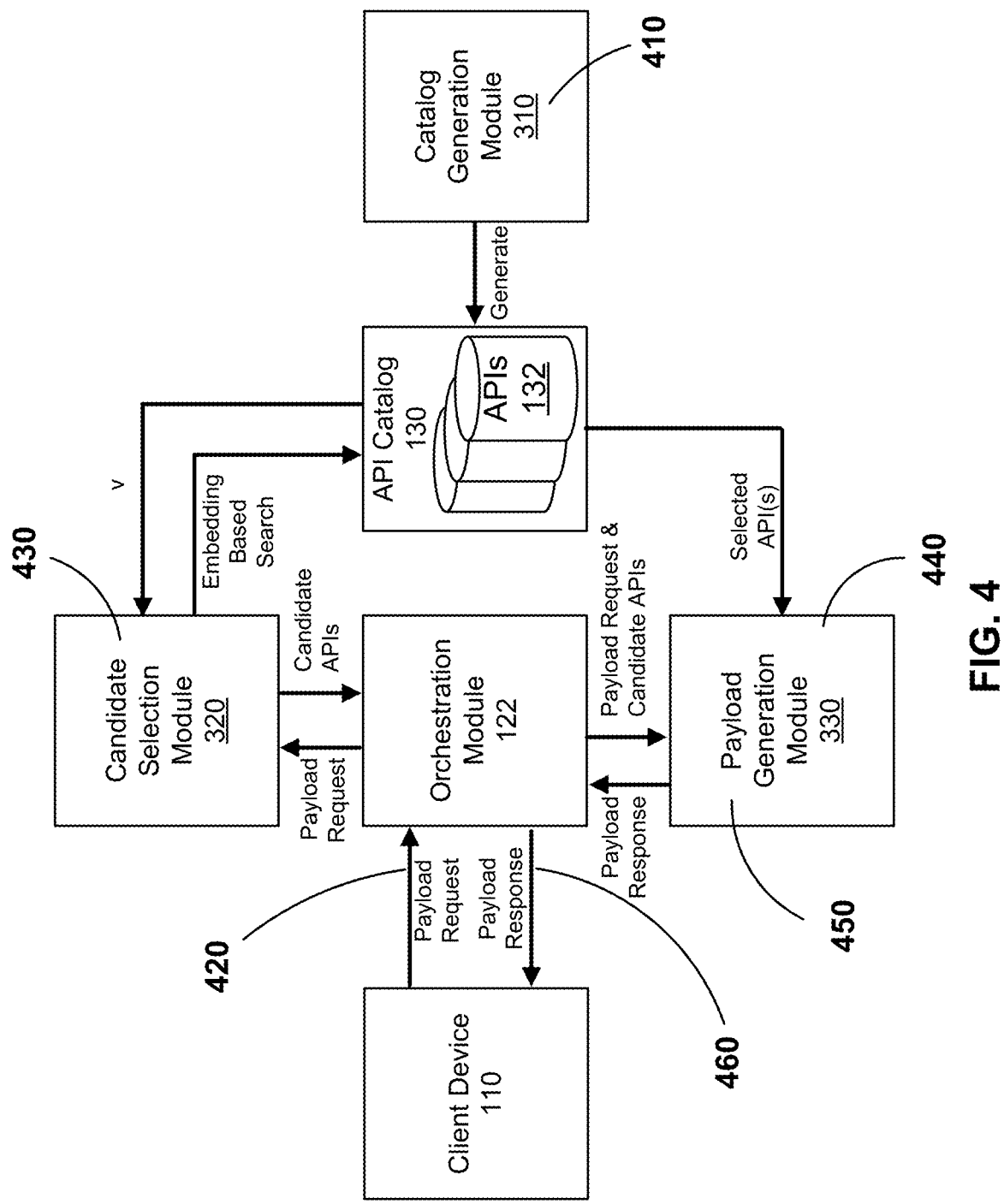
FIG. 4 illustrates a workflow diagram for generating a payload response in the system environment, according to an example embodiment.

FIG. 4 illustrates a workflow diagram for generating a payload response in the system environment, according to an example embodiment.

At 410, an orchestration module 122 employs a catalog generation module 310 to generate an API catalog 130. The API catalog 130 includes APIs 132 from, e.g., one or more network systems 150 of the data corpus 160. Each API 132 in the catalog is configured to perform one or more functions using information within a system environment 100. The orchestration module 122 extracts information describing each API, and that information may be employed by orchestration module 122 to generate candidate APIs.

At 420, a user operating a client device 110 generates a payload request and transmits the payload request to an orchestration module 122 via a network 170. The payload request is a natural language statement requesting information accessible or derivable using information within a system environment 100 (e.g., using APIs 132 from the API catalog 130).

At 430, the orchestration module 122 employs a candidate selection module 320 to determine candidate APIs from an API catalog 130. To do so, the orchestration module 122 applies a small language model to the payload request and the information describing the APIs in the API catalog 130. The small language model selects candidate APIs based on trained embeddings of the small language model that map language in a payload request to the functionality of the various APIs in an API catalog 130.

At 440, the orchestration module 122 employs a payload generation module 330 to determine a selected API from candidate APIs. To do so, the orchestration module 122 applies a large language model to the payload request and the candidate APIs. The large language model interprets the context and intent of the payload request to select the best candidate API to generate an appropriate payload response.

At 450, the orchestration module 122 employs the payload generation module 330 to execute the selected API to generate a payload response.

At 460, the orchestration module 122 transmits the payload response to the client device 110.

Figure 5:
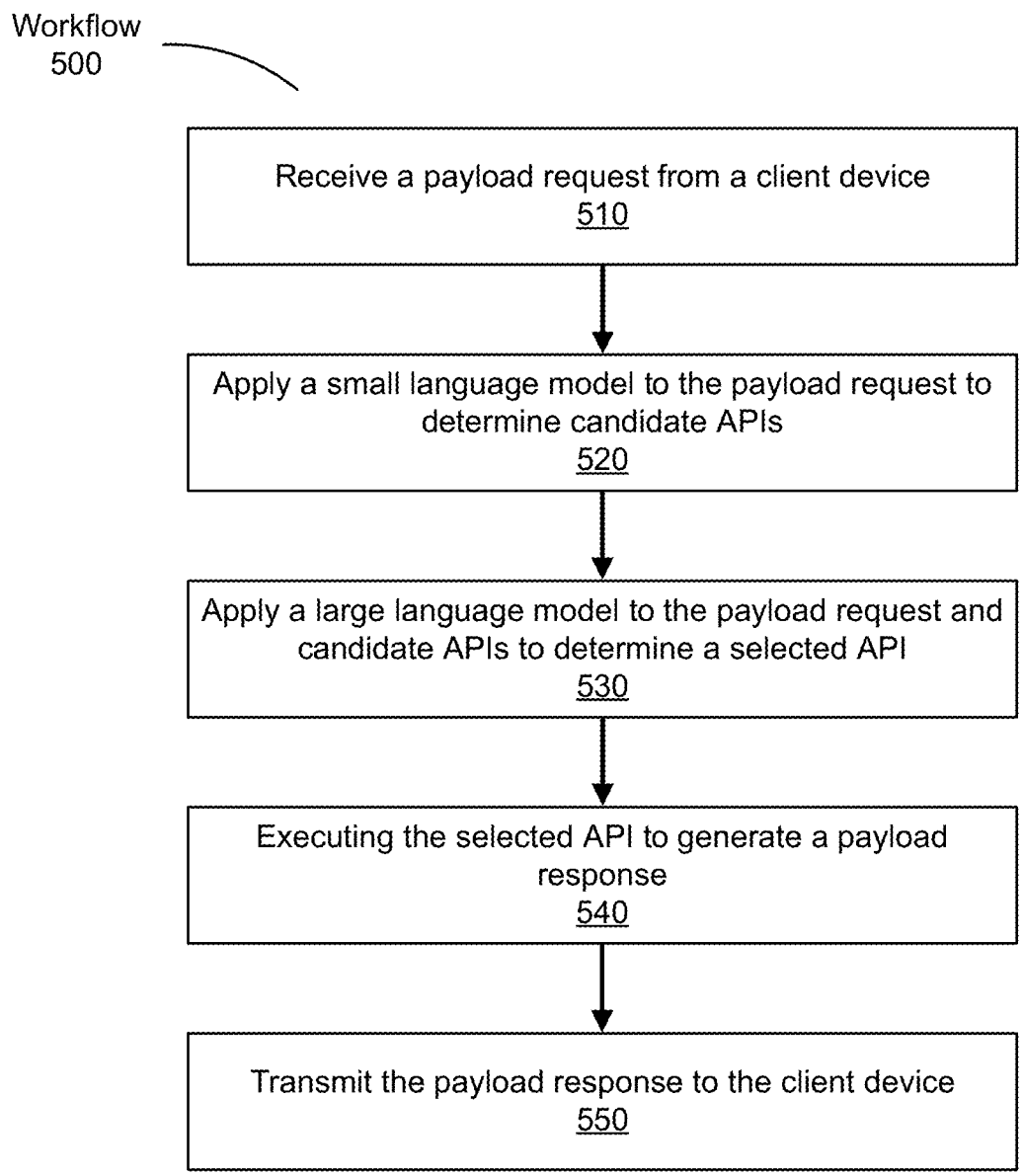
FIG. 5 illustrates an example workflow for generating a payload response in the system environment, according to an example embodiment.

FIG. 5 illustrates an example workflow for generating a payload response in the system environment, according to an example embodiment. The method described by the workflow 500 may include additional or fewer steps, and/or the steps may occur in a different order. Moreover, one or more of the steps may be repeated or omitted.

In the workflow, a user is operating a client device 110 to generate payload requests for the network system 120, and the network system 120 provides payload response in response to those requests. In this example, the user generates payload requests that include the request for a result from an API 132 that performs a requested functionality.

Within the system environment is an API catalog 130. The API catalog 130 includes APIs 132, one or more of which perform the requested functionality. The network system 120 employs the orchestration module 122 to catalog APIs in the library—mapping information associated with each API (e.g., metadata information) into a vector space representing the API 132.

The user generates the payload request using, e.g., an application 210 on the client device 110. The payload request includes a request for information within the system environment 100 (e.g., available in the data corpus 160). The request is a natural language request for the requested functionality. The user transmits the payload request to the network system 120, and the network system 120 receives 510 the payload request.

The network system 120, using the orchestration module 122, applies 520 a small language model to the payload request to determine a set of candidate APIs in the API catalog 130. To do so, the small language model parses the natural language of the payload request into a set of embeddings in vector space. The small language model uses the embeddings of the payload request to search for APIs that provide the requested functionality, in effect comparing the embeddings representing the payload request to the embeddings representing the API in vector space. The candidate APIs are those APIs above a threshold degree of similarity between the embeddings representing the payload request and those representing the APIs.

Notably, because this orchestration module 122 first applies the small language model, one or more of the candidate APIs may not provide the relevant functionality. This may occur because, as described above, the small language model is less robust than a large language model and does not interpret the context and intent of a natural language request.

The network system 120, using the orchestration module 122, applies 530 a large language model to the payload request and the set of candidate APIs. To do so, the large language model parses the natural language of the payload request and the candidate APIs (and, in some cases, their associated meta data) into a set of embeddings. The large language model uses the embeddings to determine the intent and context of the natural language request, and uses the intent and context to determine which of the candidate APIs is the most relevant for providing the requested functionality. The large-language model selects the candidate API having the highest probability of providing the requested functionality as the selected API.

The network system 120 executes 540 the selected API to generate a payload response that provides the requested functionality, e.g., determining a set of relevant information from the data corpus 160. The network system 120 transmits the payload response to the client device 110.

III. Additional Configuration Examples

In some example configurations, the system environment 100 may have one or more catalogs 130. The system environment 100 may include a first catalog with a first set of APIs, a second catalog with a second set of APIs, etc. In generating the one or more catalogs 130 the network system 120 may group API into catalogs based on any number of parameters or characteristics (e.g., size, network system 150 from which it was obtained, metadata, etc.). Additionally, a user of a client device 110 may define how catalogs are generated.

In some example configurations, a user of a client device 110 may define which API catalog 130 (or catalogs) in the system environment 100 to choose candidate APIs from. Similarly, in some configurations, the network system 120 may determine which catalogs are most appropriate for selecting candidate APIs based on the language of the payload request. For instance, the network system 120 may determine that a first catalog or set of catalogs would include APIs associated with a payload request, while determining a second catalog or set of catalogs does not include APIs associated with the payload request. So, overall, the network system 120 may select both the API catalogs 130 and the APIs 132 from those catalogs based on the natural language in the natural language request.

In some example configurations, a user of a client device 110 may provide a payload request that results in one or more payload responses. For instance, the user may provide a payload request that requests two pieces of information, and the orchestration module 122 may provide payload responses, each of which provides an individual response for the payload request. Similarly, a user of a client device 110 may provide a payload request that results in the selection of one or more APIs to generate a payload response for that single request. For instance, a single payload request may select two or more APIs that, in conjunction, provide the information requested in the payload request.

Chain Execution Agent

As noted above, the orchestration module 122 may chain the selection and execution of APIs to generate the requested functionality. To provide a simple illustration, consider an example where a payload request R requests the desired functionality D. However, in this example, there is no single API that can provide the requested functionality D given the set of APIs 132 in the API catalog 130. As such, the orchestration module 122 may employ a chain orchestration agent to generate a chain of APIs 132 to provide the requested functionality F.

The chain orchestration agent may identify a set of candidate APIs for the API chain. The candidate APIs are those that, when executed in some combination and order, provide the requested functionality. So, the chain orchestration agent may identify APIs that provide functionalities A, B, C, D, and E. Stated differently, some of the identified APIs and/or some combination of the identified API provide a partial functionality, but at least one set of the APIs from the identified APIs provide requested functionality when executed in the appropriate order. To illustrate, continuing the example, the chain orchestration agent may determine that executing some ordered combination of the APIs providing partial functionalities A, B, C, D, and E provides the requested functionality F.

A chain orchestration agent may be configured to select candidate APIs for an API chain in different manners. In an example, the chain orchestration agent may select a superset of APIs 132 from the API catalog 130 based on the natural language query to provide the requested functionality. This process is described above, which, briefly, selects APIs that have a likelihood (e.g., above a threshold, highest, etc.) of providing the requested functionality based on vectors describing the functionality and outputs of those APIs. In making this determination, the chain orchestration agent may select the APIs based on likelihoods that subsets of superset of APIs (e.g., API chains) have some likelihood of providing the requested functionality when executed in series.

Using this structure, the chain orchestration agent may select a first API from the superset to execute. The executed API generates an output that provides a partial functionality (different from the requested functionality). Based on the output including the partial functionality, the chain orchestration agent may select an additional API from the superset of APIs that have a likelihood of providing the requested output. In an embodiment, the chain orchestration agent may apply a large language model to the output providing the partial functionality and the superset of APIs to determine a next API in the chain. The next API in the chain, when executed, may provide a partial functionality or the requested functionality. The process of continually selecting additional APIs for the API chain continues until the requested functionality is generated. At this point, the orchestration module 122 provides the requested functionality to the user as a payload response. Again, in some configuration, providing the payload response may be providing the output itself, or the APIs for execution on a client device locally.

Notably, in a different configuration, rather than pre-selecting a superset of APIs and continually selecting APIs for an API chain from that superset, the chain orchestration agent may select APIs for the API chain from the broader store of APIs 132 and/or API catalogs 130. In this manner, the chain orchestration agent may adaptively update the APIs that can be used in the chain based on the partial functionality that is output from APIs in the API chain.

Figure 6:
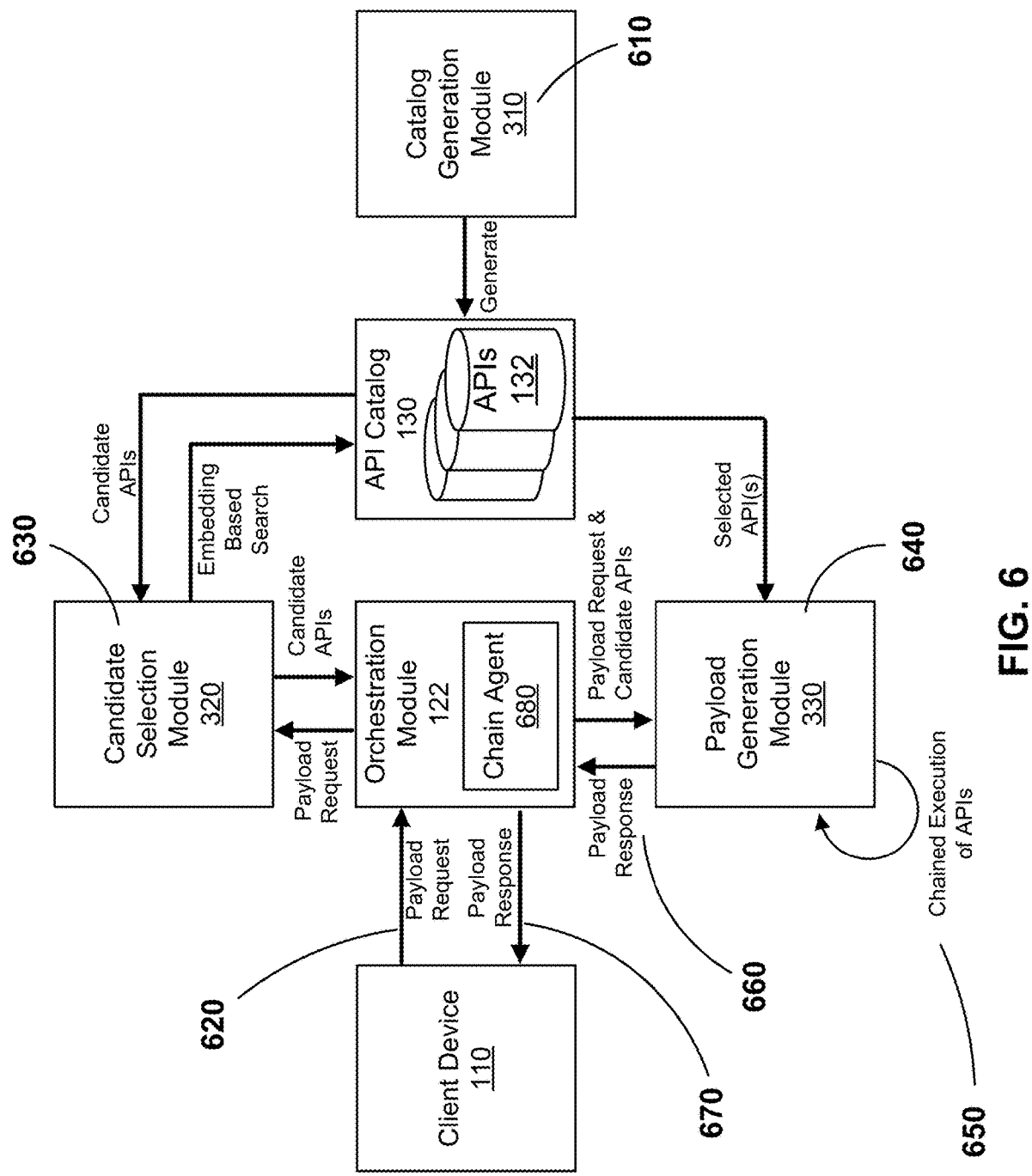
FIG. 6 illustrate a workflow diagram for generating a payload response in the system environment including a chain agent, according to an example embodiment.

FIG. 6 illustrates a workflow diagram for generating a payload response in the system environment, according to an example embodiment.

At 610, an orchestration module 122 employs a catalog generation module 310 to generate one or more API catalogs 130. The API catalogs 130 include APIs 132 from, e.g., one or more network systems 150 of the data corpus 160. Each API 132 in the catalog is configured to perform one or more functions using information within a system environment 100. Each API may provide the requested functionality, or a partial functionality related to the requested functionality. The orchestration module 122 extracts information describing each API (e.g., titles, metadata, output examples, etc.), and that information may be employed by orchestration module 122 to generate candidate APIs.

At 620, a user operating a client device 110 generates a payload request and transmits the payload request to an orchestration module 122 via a network 170. The payload request is a natural language statement requesting information accessible and/or derivable using information within a system environment 100 (e.g., using APIs 132 from the API catalog 130).

At 630, the orchestration module 122 receives the payload request. The orchestration module 122 includes a chain orchestration agent (e.g., chain agent 680). The chain agent is configured to generate a chain of APIs that provide the requested functionality, where each API in the chain provides only a partial functionality related to the requested functionality. The orchestration module 630 employs a candidate selection module 320 to determine candidate APIs from an API catalog 130. The candidate APIs may be those identified to provide the requested functionality or a partial functionality related to the requested functionality. To do so, the orchestration module 122 applies a small language model to the payload request and the information describing the APIs in the API catalog 130 (e.g., compares embeddings of the APIs to embeddings of the natural language request). The small language model selects candidate APIs based on trained embeddings of the small language model that map language in a payload request to the functionality of the various APIs in an API catalog 130.

At 640, the orchestration module 122 employs a payload generation module 330 to determine a first selected API from candidate APIs. The first selected API is the first API in the API chain that, when executed provides the requested functionality. To do so, the orchestration module 122 applies a large language model to the payload request and the candidate APIs. The large language model interprets the context and intent of the payload request to select the best candidate API to generate an appropriate payload response.

At 650, the orchestration module 122 employs the payload generation module 330 to execute the selected API to generate an output. In this case, the first API provides the partial functionality that is different from the requested functionality. Because the partial functionality is different from the requested functionality, the chain agent 680 determines a second selected API from the candidate APIs for execution. The payload generation module 330 continues to select candidate APIs for an API chain and evaluate the next APIs in the API chain until the requested functionality is achieved.

At 660, once the requested functionality is achieved, the orchestration module 122 employs the payload generation module 330 to execute the chain of APIs to generate a payload response (or provide the outputs having partial functionality as the payload response).

At 670, the orchestration module 122 transmits the payload response to the client device 110.

Figure 7:
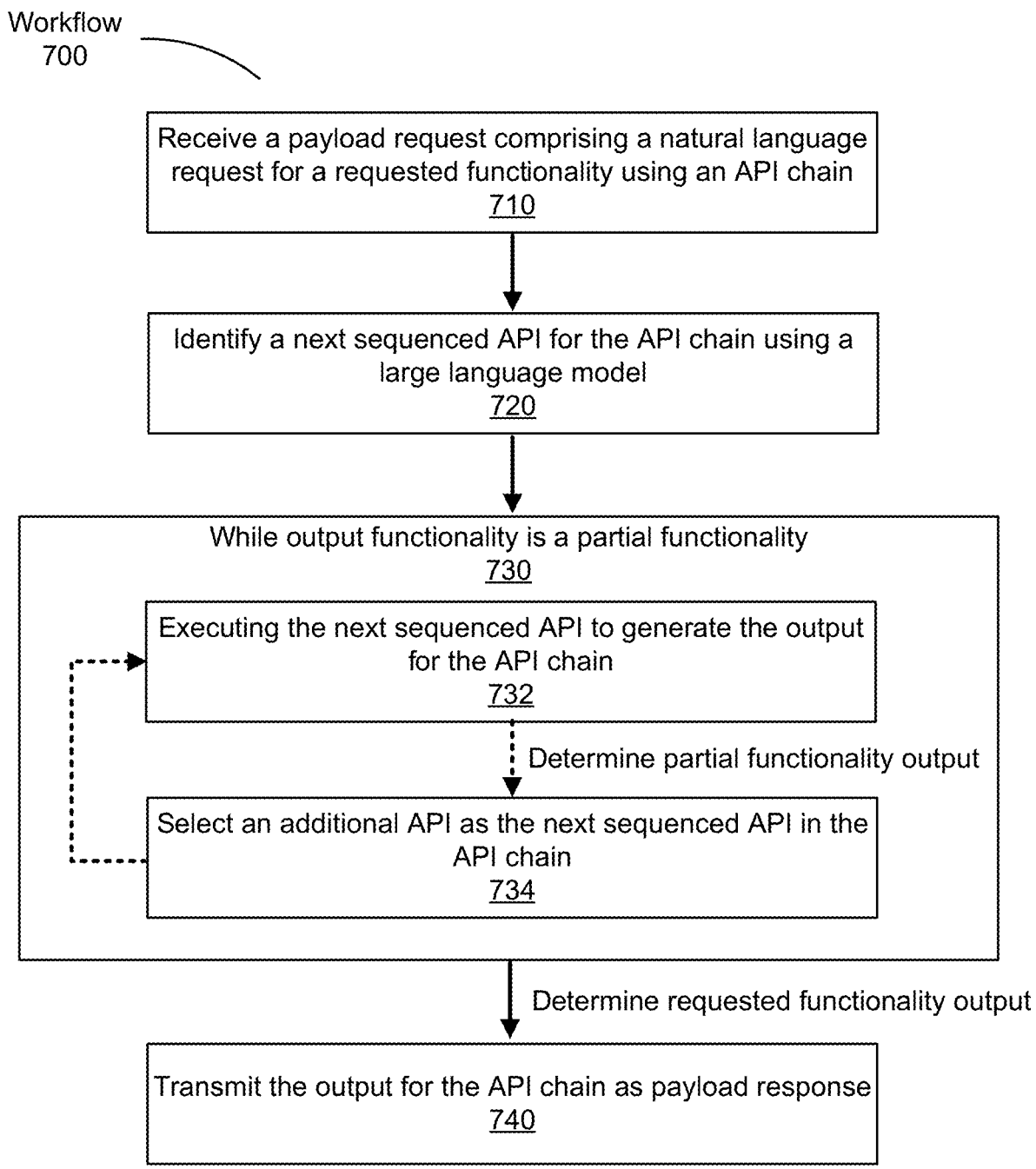
FIG. 7 illustrates an example workflow for generating a payload response in the system environment, according to an example embodiment.

FIG. 7 illustrates an example workflow for generating a payload response in the system environment, according to an example embodiment. The method described by the workflow 700 may include additional or fewer steps, and/or the steps may occur in a different order. Moreover, one or more of the steps may be repeated or omitted.

In the workflow, a user is operating a client device 110 to generate payload requests for the network system 120, and the network system 120 provides payload response in response to those requests. In this example, the user generates payload requests that include the request for a result from an API 132 that performs a requested functionality.

Within the system environment is an API catalog 130. The API catalog 130 includes APIs 132, one or more of which perform the requested functionality. The network system 120 employs the orchestration module 122 to catalog APIs in the library—mapping information associated with each API (e.g., metadata information) into a vector space representing the API 132.

The user generates the payload request using, e.g., an application 210 on the client device 110. The payload request includes a request for information within the system environment 100 (e.g., available in the data corpus 160). The request is a natural language request for the requested functionality. The user transmits the payload request to the network system 120, and the network system 120 receives 710 the payload request. In this case, the requested functionality is achievable using an API chain. The API chain includes an iteratively sequenced set of APIs, each of which provide a partial functionality different than the requested functionality. Some set of the partial functionalities, in aggregate, provide the requested functionality.

The network system 120, using the orchestration module 122, applies a small language model to the payload request to determine a set of relevant APIs in the API catalog 130. To do so, the small language model parses the natural language of the payload request into a set of embeddings in vector space. The small language model uses the embeddings of the payload request to search for APIs that provide the requested functionality and/or a partial functionality relevant to the requested functionality. This, in effect, compares the embeddings representing the payload request to the embeddings representing the API in vector space. The relevant APIs are those APIs above a threshold degree of similarity between the embeddings representing the payload request and those representing the APIs.

Notably, because this orchestration module 122 applies the small language model, one or more of the candidate APIs may not provide the relevant functionality. This may occur because, as described above, the small language model is less robust than a large language model and does not interpret the context and intent of a natural language request.

The network system 120, using the orchestration module 122, identifies 720 a next sequenced API chain (the first sequenced API in the chain) from the relevant APIs. To do so, the orchestration module 122 applies the large language model to the relevant APIs and selects an API predicted to provide a partial functionality that, when chained with additionally APIs in an API chain, provides the requested functionality.

The network system 120, executes APIs in the API chain to generate an output of the API chain. While the output of the API chain is a partial functionality different from the requested functionality 730, the orchestration module 122 executes 732 the next sequenced API in the API chain to generate the output for the API chain.

Responsive to determining the output for the API chain is the partial functionality, the orchestration system selects 734 an additional API of the plurality of relevant APIs as the next sequenced API in the API chain. The next sequenced API is selected by the large language model by analyzing the most recent partial functionality generated by the API chain and the partial functionality of the relevant APIs to determine which relevant API has a partial functionality most likely to provide the requested functionality. The large language model makes this determination based on embeddings for the relevant APIs, APIs previously executed by the API chain, the requested functionality, etc. Overall, the next sequenced API is configured to provide the requested functionality using the partial functionality provided by the API chain (or a partial functionality closer to the requested functionality).

The network system 120, continues to execute APIs in the API chain and select additional APIs for the API chain until the requested functionality is output. Responsive to determining the output for the API chain is the requested functionality, the network system 120 transmits 740 the output providing the requested functionality as the payload response to the client device.

Schedule Execution Agent

As noted above, the orchestration module 122 may chain the selection and execution of APIs to generate the requested functionality (e.g., sequential execution and evaluation of partial functionality to achieve desired functionality). The example above demonstrated that, after each execution of an API, the orchestration module 122 can again determine a next API in an API chain to execute. Notably, this solution has several drawbacks. For instance, at each step in the chain, the orchestration module 122 again determines a next API for the API chain. The next API in the API chain is the API to evaluate that will provide partial functionality closer to the requested functionality F. This process, understandably, is computationally intensive because it requires the chain orchestration agent to continuously evaluate API responses and select new APIs based on out partial functionality generated by APIs executed in the API chain. Additionally, this process can be slow to accomplish because there may be many evaluations necessary to move from partial, interim functionality to desired functionality.

To alleviate this issue, the orchestration module 122 may be configured with a schedule orchestration agent the generates an API schedule. An API schedule is similar to an API chain in that it is a sequenced set of APIs that provide the desired functionality F. Unlike the API chain, however, the schedule orchestration agent determines and schedules all the APIs for the API schedule before execution begins. That is, rather than iteratively evaluating each partial functionality (as occurs in an API chain), the schedule orchestration agent predicts the output of each API and schedules APIs to an API schedule such that the APIs in the API schedule provide the requested functionality F.

To illustrate, the schedule orchestration agent may identify a set of APIs that, when executed in some ordered combination, provide the requested functionality. So, the schedule orchestration agent may identify candidate APIs that provide functionalities A, B, C, D, and E. Stated differently, some of the identified APIs and/or some combination of the identified APIs provide a partial functionality, but at least one set of the APIs from the identified APIs, when executed in order, provide requested functionality. Thus, continuing the example, the schedule orchestration agent may determine that executing candidate APIs providing partial functionality B, C, and D (in order) has a high probability of providing the requested functionality F. In making this determination, the chain orchestration agent may identify that, e.g., executing candidate API's to provide requested functionalities A, B, C, BC, DAB, etc. only provide a partial functionality. In some cases, the API schedule may include simultaneous execution of API whose partial functionality is utilized by a next API in the API schedule.

A schedule orchestration agent may be configured to select candidate APIs for an API schedule in different manners. In an example, the schedule orchestration agent may select a superset of APIs 132 from the API catalog 130 based on the natural language query to provide the requested functionality. This process is described above, which, briefly, selects APIs that have a likelihood (e.g., above a threshold, highest, etc.) of providing the requested functionality based on vectors describing the functionality and outputs of those APIs. In making this determination, the schedule orchestration agent may select the APIs based on likelihoods that subsets of superset of APIs (e.g., API schedule) have some likelihood of providing the requested functionality when executed in series.

Figure 8:
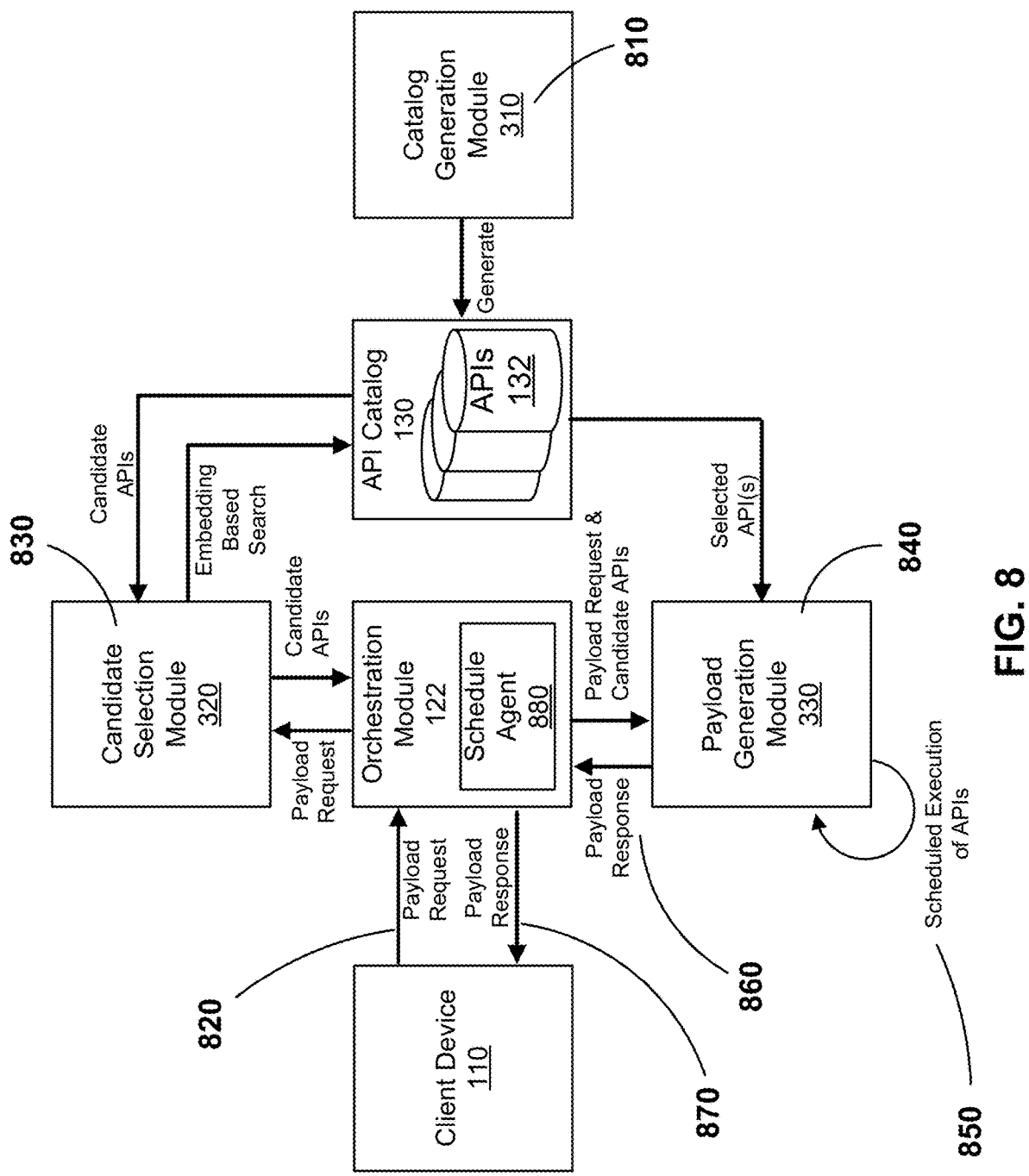
FIG. 8 illustrates a workflow diagram for generating a payload response in the system environment, according to an example embodiment.

FIG. 8 illustrates a workflow diagram for generating a payload response in the system environment, according to an example embodiment.

At 810, an orchestration module 122 employs a catalog generation module 310 to generate one or more API catalogs 130. The API catalogs 130 include APIs 132 from, e.g., one or more network systems 150 of the data corpus 160. Each API 132 in the catalog is configured to perform one or more functions using information within a system environment 100. Each API may provide the requested functionality, or a partial functionality related to the requested functionality. The orchestration module 122 extracts information describing each API (e.g., titles, metadata, output examples, etc.), and that information may be employed by orchestration module 122 to generate candidate APIs.

At 820, a user operating a client device 110 generates a payload request and transmits the payload request to an orchestration module 122 via a network 170. The payload request is a natural language statement requesting information accessible and/or derivable using information within a system environment 100 (e.g., using APIs 132 from the API catalog 130).

At 830, the orchestration module 122 receives the payload request. The orchestration module 122 includes a schedule orchestration agent (e.g., schedule agent 880). The schedule agent is configured to generate a schedule of APIs that provide the requested functionality, where each API in the schedule provides only a partial functionality related to the requested functionality. The orchestration module 830 employs a candidate selection module 320 to determine candidate APIs from an API catalog 130. The candidate APIs may be those identified to provide the requested functionality or a partial functionality related to the requested functionality. To do so, the orchestration module 122 applies a small language model to the payload request and the information describing the APIs in the API catalog 130 (e.g., compares embeddings of the APIs to embeddings of the natural language request). The small language model selects candidate APIs based on trained embeddings of the small language model that map language in a payload request to the functionality of the various APIs in an API catalog 130.

At 840, the orchestration module 122 employs a payload generation module 330 to determine selected APIs for an API schedule from candidate APIs. Each selected API provides a partial functionality. The ordered set of selected APIs, when executed sequentially, provide the requested functionality. To select the selected APIs for the API schedule, the orchestration module 122 applies a large language model to the payload request and the candidate APIs. The large language model interprets the context and intent of the payload request to select the best candidate API to generate an appropriate payload response.

At 850, the orchestration module 122 employs the payload generation module 330 to sequentially execute the API schedule to generate the requested functionality.

At 860, once the requested functionality is output, the orchestration module 122 employs the payload generation module 330 to generate a payload response (or provide the outputs having partial functionality as the payload response).

At 870, the orchestration module 122 transmits the payload response to the client device 110.

Figure 9:
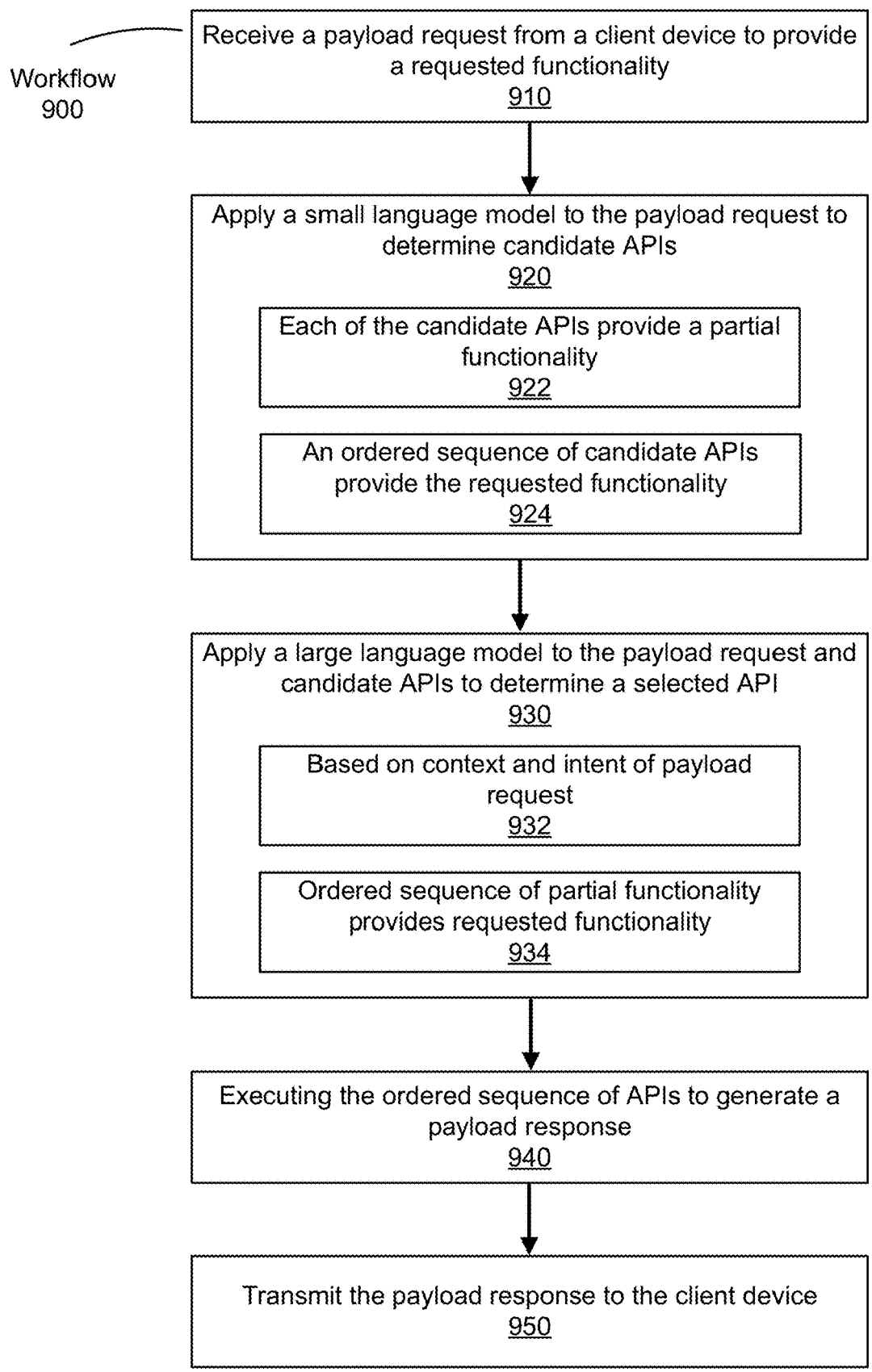
FIG. 9 illustrates an example workflow for generating a payload response in the system environment, according to an example embodiment.

FIG. 9 illustrates an example workflow for generating a payload response in the system environment, according to an example embodiment. The method described by the workflow 900 may include additional or fewer steps, and/or the steps may occur in a different order. Moreover, one or more of the steps may be repeated or omitted.

In the workflow, a user is operating a client device 110 to generate payload requests for the network system 120, and the network system 120 provides payload response in response to those requests. In this example, the user generates payload requests that include the request for a result from an API 132 that performs a requested functionality.

Within the system environment is an API catalog 130. The API catalog 130 includes APIs 132, one or more of which perform the requested functionality. The network system 120 employs the orchestration module 122 to catalog APIs in the library—mapping information associated with each API (e.g., metadata information) into a vector space representing the API 132.

The user generates the payload request using, e.g., an application 210 on the client device 110. The payload request includes a request for information within the system environment 100 (e.g., available in the data corpus 160). The request is a natural language request for the requested functionality. The user transmits the payload request to the network system 120, and the network system 120 receives 910 the payload request. In this case, the requested functionality is achievable using an API schedule (e.g., an ordered sequence of APIs). The API schedule includes a sequenced set of APIs, each of which provide a partial functionality different than the requested functionality. The partial functionalities, when executed in a sequenced order, provide the requested functionality.

The network system 120, using the orchestration module 122, applies a small language model to the payload request to determine a set of relevant APIs in the API catalog 130. To do so, the small language model parses the natural language of the payload request into a set of embeddings in vector space. The small language model uses the embeddings of the payload request to search for APIs that provide the requested functionality and/or a partial functionality relevant to the requested functionality. This, in effect, compares the embeddings representing the payload request to the embeddings representing the API in vector space. The relevant APIs are those APIs above a threshold degree of similarity between the embeddings representing the payload request and those representing the APIs.

Notably, because this orchestration module 122 applies the small language model, one or more of the candidate APIs may not provide the relevant functionality. This may occur because, as described above, the small language model is less robust than a large language model and does not interpret the context and intent of a natural language request.

The network system 120, using the orchestration module 122, applies 930 a large language model to the payload request and the set of relevant APIs. To do so, the large language model parses the natural language of the payload request and the relevant APIs (and, in some cases, their associated meta data) into a set of embeddings. The large language model uses the embeddings to determine the intent and context 932 of the natural language request, and uses the intent and context to determine which of the relevant APIs is the most relevant for providing the requested functionality. Additionally, the large language model determines an ordered sequence of relevant APIs that, when executed in the ordered sequence provide the requested functionality 934. The large language model makes this determination based on the partial functionalities of each of the relevant APIs. The large-language model selects the relevant API having the highest probability of providing the requested functionality when executed in an ordered sequence as the API schedule (e.g., ordered sequence of APIs).

The network system 120 executes 940 the ordered sequence of APIs to generate a payload response that provides the requested functionality, e.g., determining a set of relevant information from the data corpus 160. The network system 120 transmits 950 the payload response to the client device 110.

IV. Computer System

Figure 10:
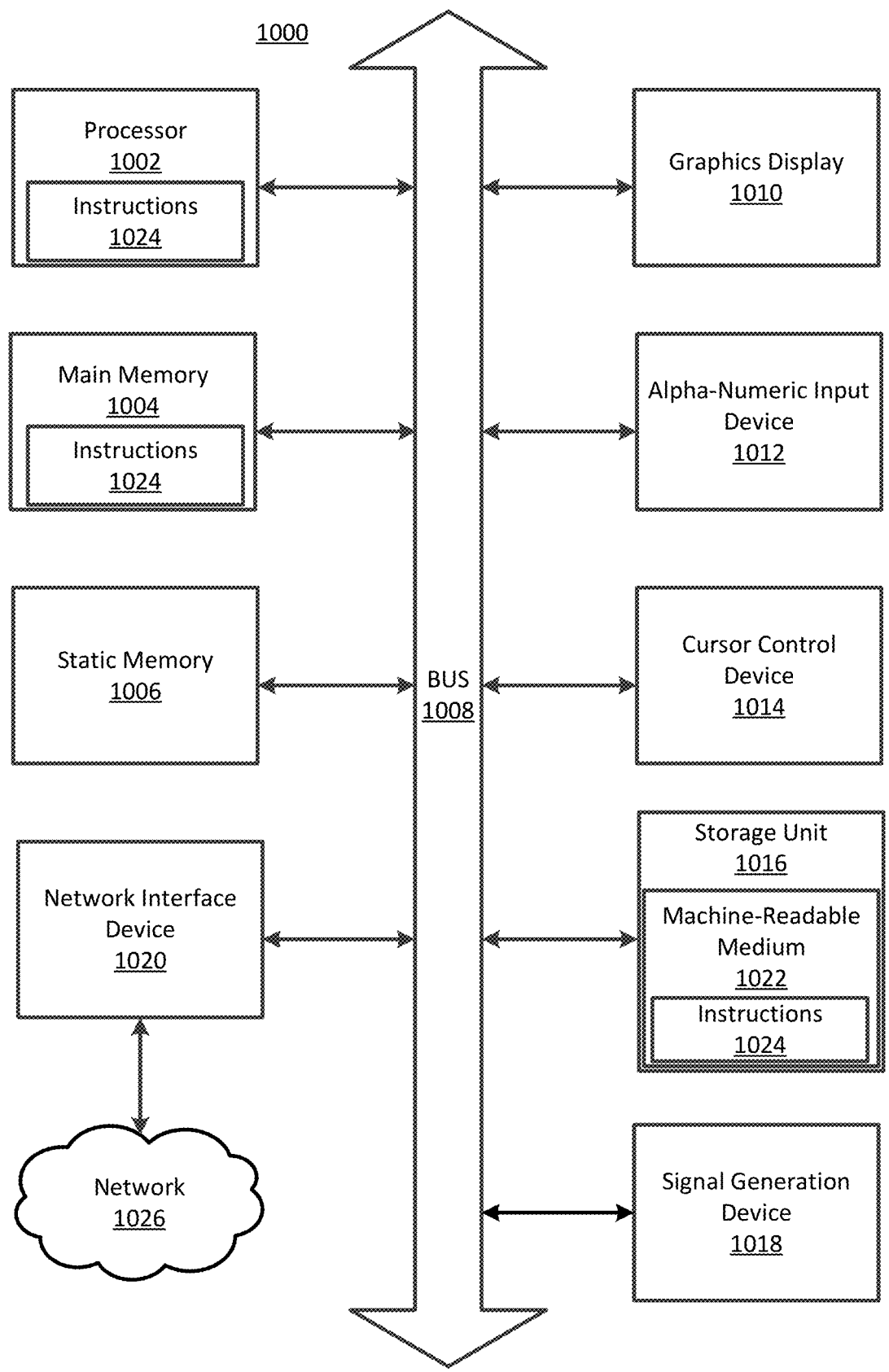
FIG. 10 is a block diagram illustrating components of an example machine for reading and executing instructions from a machine-readable medium, according to an example embodiment.

FIG. 10 is a block diagram illustrating components of an example machine for reading and executing instructions from a machine-readable medium, according to an example embodiment. Specifically, FIGS. 1-3 show a diagrammatic representation of computer systems employed throughout the Specification. These systems can be in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include the functionalities of modules of the systems described in FIG. 1. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026 (e.g., network 170) via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A method for generating a payload response for a requested functionality in a system environment, the method comprising:
   receiving, at a network system, a payload request from a client device, the payload request comprising a natural language request for the requested functionality;
   applying, at the network system, a small language model to the payload request to determine a set of candidate APIs from a catalog based on embeddings generated by the small language model that map the natural language in the payload request to the functionality of the APIs in the catalog, wherein determining the set of candidate APIs comprises:
      determining, for each API of a plurality of APIs in the catalog, a score quantifying a likelihood the API is semantically or syntactically relevant to language in the payload request; and
      selecting the APIs having scores above a threshold score as candidate APIs in the set of candidate APIs;
   applying, at the network system, a large language model to the payload request and the candidate APIs to determine a selected API that performs the requested functionality, the large language model interpreting context and intent of the payload request to select a candidate API from the set of candidate APIs as the selected API based on the context and intent; and
   providing the payload response to the client device, the providing comprising:
      providing a location of the selected API to the client device;
      executing, using a system hosting the API at the location, the selected API to generate a payload response including the requested functionality; and
      transmitting, from the system to the client device, the generated payload response.

2. The method of claim 1, further comprising:
   generating the catalog for the network system by:
      accessing a plurality of APIs within a system environment comprising the network system;
      determining metadata associated with a functionality of each of the APIs in the plurality of APIs; and
      wherein the set of candidate APIs are selected from the plurality of APIs.

3. The method of claim 2, further comprising:
   training the small language model to identify candidate APIs by mapping metadata describing the functionality of each API to language samples representing a plurality of payload requests.

4. The method of claim 2, wherein accessing a plurality of APIs within the system environment comprises accessing APIs from one or more additional network systems.

5. The method of claim 1, wherein applying the large language model to the payload request and the set candidate APIs further comprises:
   providing metadata associated with each candidate API to the large language model, and wherein selecting the candidate API as the selected API is further based on the metadata.

6. The method of claim 1, wherein selecting candidate APIs further comprises:
   determining, for each API of a plurality of APIs in the catalog, a score quantifying a likelihood the API is semantically or syntactically relevant to language in the payload request;
   selecting a number of APIs having a highest score as the candidate APIs.

7. The method of claim 1, wherein the network system executes the selected API and transmits the payload response to the client device.

8. The method of claim 1, wherein applying the large language model to the payload request and the candidate APIs to determine the selected API that performs the requested functionality comprises:
   selecting one or more additional APIs for an API chain, and wherein:
      each of the one or more additional APIs provide a partial functionality related to the requested functionality, and
      the API chain, in aggregate, provides the requested functionality.

9. A non-transitory computer-readable storage medium comprising computer program instructions for generating a payload response for a requested functionality in a system environment, the computer program instructions, when executed by one or more processors, causing the one or more processors to:
   receive, at a network system, a payload request from a client device, the payload request comprising a natural language request for the requested functionality;
   apply, at the network system, a small language model to the payload request to determine a set of candidate APIs from a catalog based on embeddings generated by the small language model that map the natural language in the payload request to the functionality of the APIs in the catalog, wherein determining the set of candidate APIs comprises:
      determining, for each API of a plurality of APIs in the catalog, a score quantifying a likelihood the API is semantically or syntactically relevant to language in the payload request; and
      selecting the APIs having scores above a threshold score as candidate APIs in the set of candidate APIs;
   apply, at the network system, a large language model to the payload request and the candidate APIs to determine a selected API that performs the requested functionality, the large language model interpreting context and intent of the payload request to select a candidate API from the set of candidate APIs as the selected API based on the context and intent; and provide the payload response to the client device, the providing comprising:
  providing a location of the selected API to the client device;
  executing, using a system hosting the API at the location, the selected API to generate a payload response including the requested functionality; and
  transmitting, from the system to the client device, the generated payload response.

10. The non-transitory computer-readable storage medium of claim 9, wherein the computer program instructions, when executed, cause the one or more processors to:
  generate the catalog for the network system by:
    accessing a plurality of APIs within a system environment comprising the network system;
    determining metadata associated with a functionality of each of the APIs in the plurality of APIs; and
    wherein the set of candidate APIs are selected from the plurality of APIs.

11. The non-transitory computer-readable storage medium of claim 10, further comprising:
  train the small language model to identify candidate APIs by mapping metadata describing the functionality of each API to language samples representing a plurality of payload requests.

12. The non-transitory computer-readable storage medium of claim 10, wherein accessing a plurality of APIs within the system environment causes the one or more processors to:
  access APIs from one or more additional network systems.

13. The non-transitory computer-readable storage medium of claim 9, wherein applying the large language model to the payload request and the set candidate APIs causes the one or more processors to:
  provide metadata associated with each candidate API to the large language model, and
  wherein selecting the candidate API as the selected API is further based on the metadata.

14. The non-transitory computer-readable storage medium of claim 9, wherein selecting candidate APIs causes the one or more processors to:
  determine, for each API of a plurality of APIs in the catalog, a score quantifying a likelihood the API is semantically or syntactically relevant to language in the payload request;
  select the APIs having scores above a threshold score as the candidate APIs.

15. The non-transitory computer-readable storage medium of claim 9, wherein the network system executes the selected API and transmits the payload response to the client device.

16. The non-transitory computer-readable storage medium of claim 9, wherein applying the large language model to the payload request and the candidate APIs to determine the selected API that performs the requested functionality comprises:
  select one or more additional APIs for an API chain, and wherein:
    each of the one or more additional APIs provide a partial functionality related to the requested functionality, and
    the API chain, in aggregate, provides the requested functionality.

17. A system comprising:
  a system hosting, at a location on the system, a system API from a plurality of APIs in a catalog;
  a client device configured to generate payload requests and receive payload responses;
  a network system comprising:
    one or more processors; and
    a non-transitory computer-readable storage medium comprising computer program instructions for generating a payload response for a requested functionality, the computer program instructions, when executed by the one or more processors, causing the network system to:
      receive a payload request from the client device, the payload request comprising a natural language request for the requested functionality;
      apply a small language model to the payload request to determine a set of candidate APIs from the catalog based on embeddings generated by the small language model that map the natural language in the payload request to the functionality of the APIs in the catalog, wherein determining the set of candidate APIs comprises:
        determining, for each API in the catalog, a score quantifying a likelihood the API is semantically or syntactically relevant to language in the payload request; and
        selecting the APIs having scores above a threshold score as candidate APIs in the set of candidate APIs;
      apply a large language model to the payload request and the candidate APIs to determine a selected API that performs the requested functionality, the large language model interpreting context and intent of the payload request to select a candidate API from the set of candidate APIs as the selected API based on the context and intent; and
      provide the location of the selected API to the client device; and
    wherein:
      the selected API is the system API, and the system executes the system API on the system to generate the payload response, and
      the system provides the payload response to the client device.

* * * * *